(12) United States Patent
Tricot et al.

(10) Patent No.: US 8,491,297 B2
(45) Date of Patent: Jul. 23, 2013

(54) DEVICE FOR THE MANUFACTURING OF A PIECE OF COMPOSITE MATERIEL WITH COMPLEX SHAPE

(75) Inventors: Rodolphe Tricot, Nantes (FR); Pierre Estragnat, Bouguenais les Couets (FR)

(73) Assignee: Airbus Operations SAS, Toulouse (FR)

( * ) Notice: Subject to any disclaimer, the term of this patent is extended or adjusted under 35 U.S.C. 154(b) by 510 days.

(21) Appl. No.: 12/570,453

(22) Filed: Sep. 30, 2009

(65) Prior Publication Data

US 2010/0078131 A1    Apr. 1, 2010

(30) Foreign Application Priority Data

Sep. 30, 2008   (FR) ...................................... 08 56574

(51) Int. Cl.
*B29C 70/44* (2006.01)
(52) U.S. Cl.
USPC ............ 425/389; 425/390; 425/440; 425/438
(58) Field of Classification Search
USPC ................... 264/510, 511; 425/389, 390, 440, 425/438, DIG. 112
See application file for complete search history.

(56) References Cited

U.S. PATENT DOCUMENTS

| | | | | |
|---|---|---|---|---|
| 2,401,299 A * | 6/1946 | Glavin | .......................... | 156/382 |
| 3,923,586 A * | 12/1975 | Gross | ............................ | 156/382 |
| 4,608,220 A * | 8/1986 | Caldwell et al. | ............... | 264/510 |
| 5,061,430 A * | 10/1991 | Lang | ............................. | 264/316 |
| 5,152,949 A * | 10/1992 | Leoni et al. | .................... | 264/257 |
| 5,378,134 A * | 1/1995 | Blot et al. | ...................... | 425/149 |
| 6,630,095 B2 * | 10/2003 | Slaughter et al. | ............. | 264/510 |
| 6,723,271 B2 * | 4/2004 | Hemphill et al. | ............. | 264/510 |
| 6,759,002 B1 * | 7/2004 | Engwall et al. | ............... | 264/510 |
| 6,796,784 B1 * | 9/2004 | Andre | ............................ | 425/195 |
| 6,851,945 B2 * | 2/2005 | Potter et al. | .................... | 425/389 |
| 6,896,841 B2 * | 5/2005 | Velicki et al. | ................. | 264/510 |
| 6,911,175 B2 * | 6/2005 | Benson et al. | ................. | 264/510 |
| 7,029,267 B2 * | 4/2006 | Caron | ............................ | 425/389 |
| 7,306,450 B2 * | 12/2007 | Hanson | .......................... | 425/383 |
| 7,622,066 B2 * | 11/2009 | Brustad et al. | ................. | 264/257 |

(Continued)

FOREIGN PATENT DOCUMENTS

| WO | WO 2005/120812 | 12/2005 |
|---|---|---|
| WO | WO 2009/020466 | 2/2009 |

OTHER PUBLICATIONS

French Search Report, dated Jun. 11, 2009, from corresponding French application.

*Primary Examiner* — Yogendra Gupta
*Assistant Examiner* — Emmanuel S Luk
(74) *Attorney, Agent, or Firm* — Young & Thompson

(57) ABSTRACT

A device for manufacturing a composite material part that includes a resin matrix reinforced by fibers and having a recessed shape with a small opening, whereby the device includes a mold whose shapes are adapted to those of the part to be produced, a compacting membrane and at least one shim that is placed in the recessed zone between the part and the compacting membrane whose function is to transmit the pressure exerted by the compacting membrane to the surfaces of the part that is in contact with the shim. The shim can be expanded and is able to occupy a first state before polymerization in which it occupies a low volume so as to allow its insertion into the recessed zone, and a second state, in particular during polymerization, in which it occupies a larger volume so as to exert pressure on the surfaces of the recessed zone.

3 Claims, 2 Drawing Sheets

U.S. PATENT DOCUMENTS

| | | | |
|---|---|---|---|
| 8,192,574 B1 * | 6/2012 | Boone | 156/285 |
| 2004/0115299 A1 * | 6/2004 | Potter et al. | 425/389 |
| 2004/0183227 A1 * | 9/2004 | Velicki et al. | 264/236 |
| 2006/0170127 A1 * | 8/2006 | Hirayama et al. | 264/102 |
| 2007/0194491 A1 * | 8/2007 | Krogager et al. | 264/258 |
| 2008/0265470 A1 * | 10/2008 | Bottacin | 264/571 |

* cited by examiner

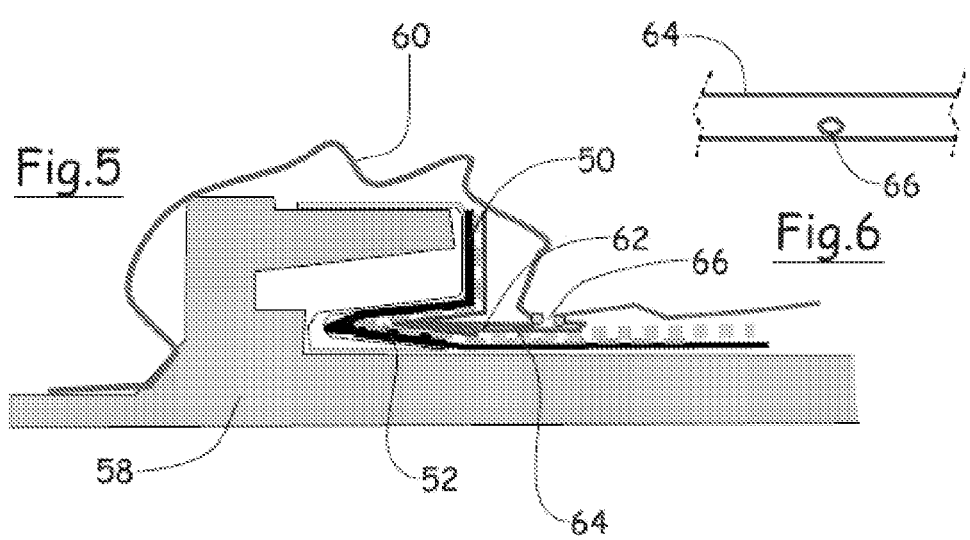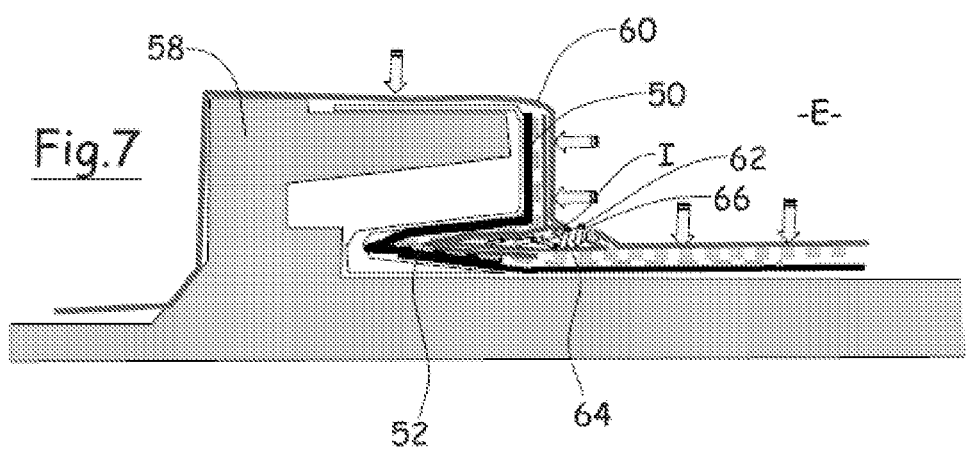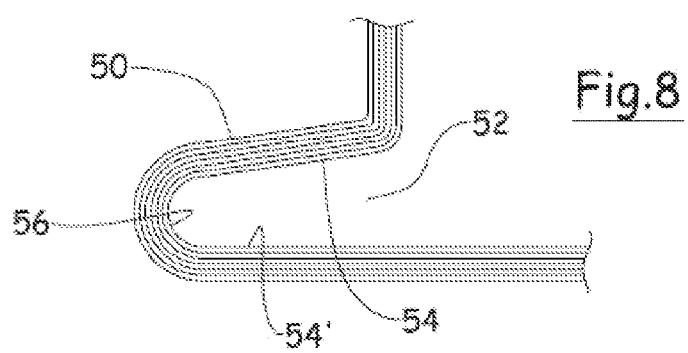

DEVICE FOR THE MANUFACTURING OF A PIECE OF COMPOSITE MATERIEL WITH COMPLEX SHAPE

This invention relates to a device for the manufacturing of a composite material part of complex shape, comprising a recessed shape with a small opening. The invention relates to a device that allows the implementation of a polymerization phase that is carried out under pressure, whereby said device comprises an airtight and relatively flexible compacting membrane that can transmit the outside pressure to the part to be produced.

The aeronautical design tends to resort to composite materials for the production of certain portions of an aircraft so as to reduce the on-board weight. The document FR-2,894,869 describes a process for the manufacturing of an aircraft fuselage of composite material.

The parts that are made of composite material comprise a resin matrix that is reinforced by fibers. According to a common embodiment, the fibers come in the form of one or more fold(s) that may or may not be woven, pre-impregnated with resin. As a variant, the fibers cannot be pre-impregnated. In this case, at least one resin film is used.

To ensure the consolidation of the composite material part, it is necessary to increase the temperature to obtain the polymerization of the resin. Pressure is exerted during the polymerization so as to expel the air and the solvents, to reduce the porosity, and to prevent the risks of defects able to reduce the mechanical characteristics of the part.

Figure 1:
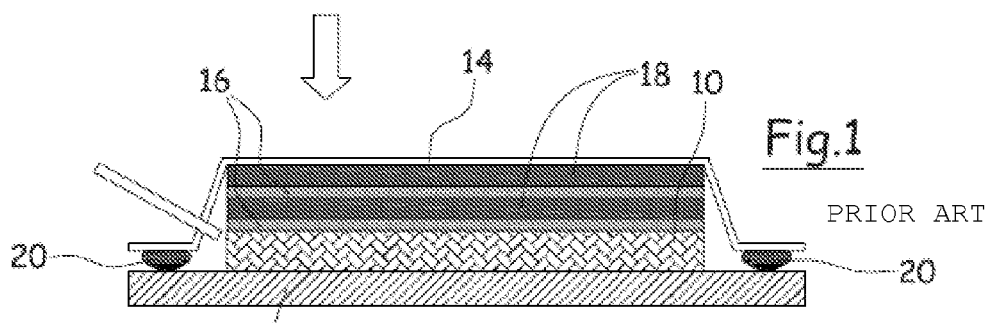

According to an embodiment that is illustrated in FIG. 1, to produce a composite material part 10, the fiber layers are draped on a mold 12, and the unit is covered by a compacting membrane 14.

Other elements such as delaminating films 16, drainage means 18, a smoothing panel, for example, are inserted between the part 10 and the compacting membrane 14.

During the polymerization phase, it is necessary to compact the fibers and the resin on the mold. This compacting is achieved using the compacting membrane 14 that forms an airtight chamber with the mold 12. For this purpose, sealing means 20 are provided on the periphery of the part between the mold 12 and the membrane 14.

According to an operating method, a pressure of several mega-pascals is applied to the compacting membrane 14 by means of a hot fluid that also provides the heat that is necessary to the polymerization of the resin. For this purpose, the device is placed in a closed chamber that is subjected to internal pressure that corresponds to the pressure that is applied to the compacting membrane. Thus, the compacting membrane 14 has as its function to transmit the pressure from the outside to the part to be produced by aiming a homogeneous distribution of the pressure over the entire surface of the part to be produced.

By way of indication, the pressure can vary on the order of 1.5 Mpa to 3 Mpa.

When the pressure is gaseous, the chamber is called an autoclave.

The device generally comprises means for evacuating or drawing in the gases that are contained between the compacting membrane 14 and the mold 12 so as to prevent the formation of micro-bubbles, which once the part is produced correspond to structural micro-defects that reduce the mechanical characteristics of the part.

This invention relates more particularly to a device that allows the implementation of this technology to produce a part of complex shape comprising a recessed zone with a small opening at the level of which it is difficult to place the compacting membrane.

Figure 2:
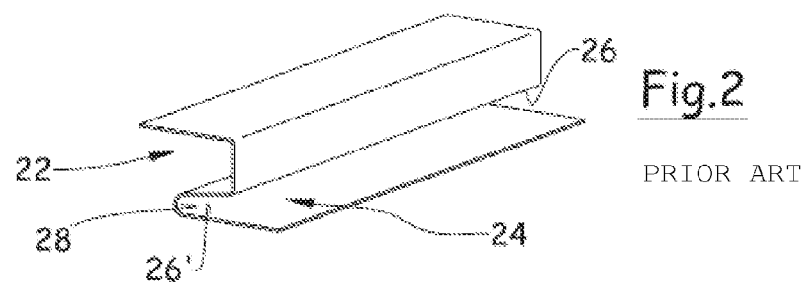

By way of example, as illustrated in FIG. 2, the part 22 of complex shape has a Z-shaped section with a recessed zone 24 with a small opening in the lower part.

A recessed zone with a small opening is defined as, at the level of this zone, the part with a concave section that consists of two opposing surfaces 26, 26' opposite one another, connected to one another at one end by a more or less rounded end surface 28 (the farthest from the opening), whereby the spacing between the two surfaces 26, 26' is relatively small at their junctions with the remainder of the surface of the part.

Figure 3:
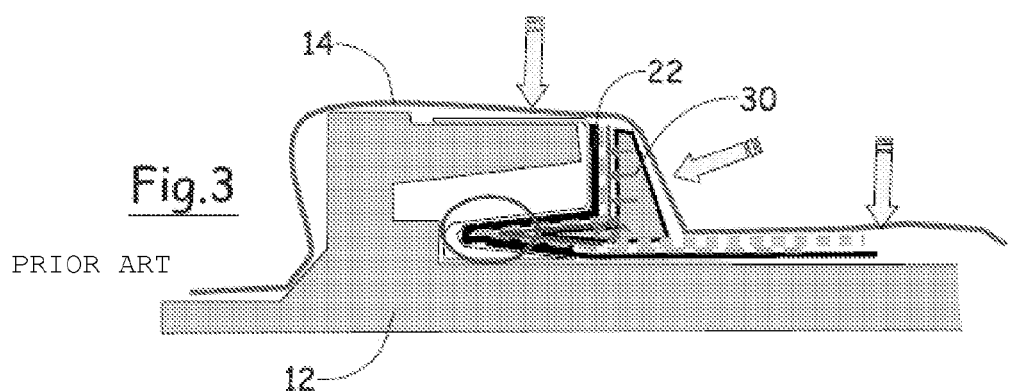

According to a known operating method, as illustrated in FIG. 3, the layers that form the part 22 are draped on a mold 12, whereby the unit is covered by a compacting membrane 14 after the installation of other elements such as delaminating films 16, drainage means 18, etc.

In the recessed zone 24, a shim 30 is placed between the part and the mold or between the part and the membrane whose one portion is arranged in the recessed zone 24, whereby the remainder of the shim 30 is flattened against the surface of the part outside of the recessed zone 24.

This non-deformable shim 30 has as its function to transmit the pressure that is exerted by the compacting membrane 14 to the surfaces of the part in contact with said shim 30.

Figure 4:
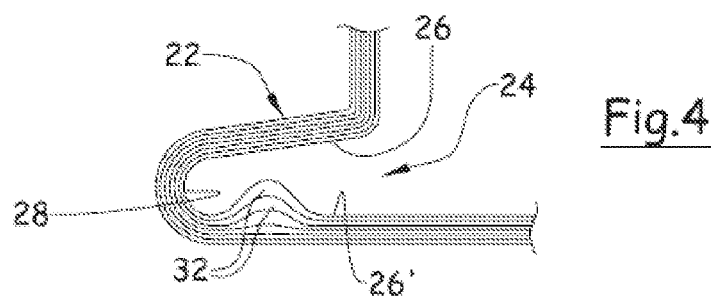

In the case of a recessed zone 24 with a small opening, the shim 30 does not allow a homogeneous distribution of the pressure on the surfaces 26, 26' and 28 of this recessed zone. Thus, there is a zone that is essentially without pressure close to the end surface 28. As illustrated in FIG. 4, this absence of pressure leads to a heterogeneous polymerization of the part and to the presence of air bubbles 32 between the fiber layers, considerably embrittling the part thus produced.

Also, the purpose of this invention is to eliminate the drawbacks of the prior art by proposing a device for the manufacturing of a composite material part of complex shape, comprising a recessed shape with a small opening, whereby said device makes it possible to obtain a homogeneous distribution of the pressure and thus to reduce the risks of defects at said recessed zone.

For this purpose, the invention has as its object a device for the manufacturing of a composite material part that comprises a resin matrix that is reinforced by fibers and that has a recessed shape with a small opening, whereby said device comprises a mold whose shapes are adapted to those of the part to be produced as well as a compacting membrane and at least one shim that is placed in the recessed zone between the part and the compacting membrane whose function is to transmit the pressure that is exerted by the compacting membrane on the surfaces of the part that is in contact with said shim, characterized in that the shim can be expanded and is able to occupy a first state before polymerization in which it occupies a low volume so as to allow its insertion into the recessed zone, and a second state, in particular during polymerization, in which it occupies a larger volume so as to exert pressure on the surfaces of the recessed zone.

Other characteristics and advantages will emerge from the following description of the invention, a description that is provided only by way of example, with regard to the accompanying drawings, in which:

FIG. 1 is a diagrammatic representation of a device for producing a composite material part according to the prior art, FIG. 2 is a perspective view of a composite material part that comprises a recessed zone with a small opening, FIG. 3 is a cutaway that illustrates a device for producing a composite material part with a recessed zone with a small opening according to the prior art, FIG. 4 is a cutaway of a composite material part that is produced from the device of FIG. 3 that illustrates the defects of the part, FIG. 5 is a cutaway of a device for producing a composite material part according to the invention before the pressurization, FIG. 6 is a diagram that illustrates a secondary bladder according to the invention, FIG. 7 is a cutaway of a device for producing a composite material part according to the invention during the pressurization, and FIG. 8 is a cutaway of a composite material part that is produced from a device according to the invention.

FIGS. 5, 7 and 8 show at 50 a composite material part that comprises a resin matrix that is reinforced by reinforcements, in particular fibers. According to a common embodiment, the fibers come in the form of one or more folds that may or may not be woven, pre-impregnated with resin. As a variant, the fibers cannot be pre-impregnated. In this case, at least one resin film is used.

The invention relates to a part 50 that comprises a recessed shape 52 with, in particular, a small opening.

A recessed zone with a small opening is defined as, at the level of this zone, the part with a concave section that consists of two opposing surfaces 54, 54' opposite one another, connected to one another at one end by a more or less rounded end surface 56 (the farthest from the opening), whereby the spacing between the two surfaces 54, 54' is relatively small at their junctions with the remainder of the surface of the part.

The device of the invention comprises a rigid mold 58 whose shapes are adapted to those of the part to be produced on or against which the reinforcements and the resin that is able to form the matrix as well as a compacting membrane 60 are supported.

As for the devices of the prior art, the device comprises sealing means at the periphery of the part between the mold 58 and the compacting membrane 60 and other elements, such as, for example, delaminating films, drainage means, inserted between the part 50 and the compacting membrane 60 and/or between the part 50 and the mold 58. The sealing means, like all of the other elements, are not described in more detail because they are known to one skilled in the art.

By way of example, the rigid mold 58 is generally metallic or based on epoxide resins. The compacting membrane that is used as a counter-mold is deformable and made of resistant rubber or, for very small series, a polyamide film, polyesters, etc.

In addition, the device can comprise means for evacuating or drawing in the gases that are present in the space that is delimited by the mold 58 and the compacting membrane 60. These means are not described in more detail because they are known to one skilled in the art.

The device comprises at least one shim 62 that is placed in the recessed zone 52 between the part and the compacting membrane 60 whose function is to transmit the pressure that is exerted by the compacting membrane 60 to surfaces of the part 50 that is in contact with said shim 62.

According to the invention, the shim 62 can be expanded and is able to occupy a first state before polymerization, in which it occupies a small volume so as to allow its insertion into a recessed zone 52 and a second state, in particular during polymerization, in which it occupies a larger volume so as to exert homogenous pressure on the surfaces of the recessed zone 52.

According to one embodiment, the expandable shim 62 comes in the form of an inflatable bladder 64 that integrates means for modifying its volume.

As illustrated in FIG. 6, in the case of a part with an essentially constant section in one direction, comprising a recessed zone 52, as illustrated in FIG. 8, the expandable shim 62 comes in the form of a tubular bladder 64 with closed ends.

However, the invention is not limited to this shape, whereby the inflatable bladder 64 has shapes that are adapted to those of the recessed zone 52.

Preferably, the pressure that is exerted by the expandable shim 62 is essentially the same as that exerted by the compacting membrane 60.

In the case of an inflatable bladder 64, the latter comprises at least one pipe or orifice 66 to link the inside volume I of the inflatable bladder with the outside E of the device that can be subjected to pressure during the polymerization phase.

According to one embodiment that is illustrated in the figures, the bladder 64 comprises at least one orifice 66 that works with an orifice that is made at the compacting membrane 60, means for ensuring the sealing being provided around orifices between the bladder and the compacting membrane. These sealing means can be separate elements or the sealing function can be ensured by the nature of the connection between the bladder and the compacting membrane, in particular in the case of welding between these two elements.

The implementation of the device is now described with regard to FIGS. 5 and 7 for an application whose purpose is to obtain a Z-shaped composite material part starting from pre-impregnated fiber layers.

In a first step, the fiber layers are deposited on the mold 58 according to a very specific loading plan, whereby the fibers are oriented in the direction of mechanical stresses of the part. This very painstaking operation that is called draping is generally manual. However, it could be automated.

Means for drawing in or evacuating the gases can be installed if necessary.

The additional elements such as drainage means, delaminating films, a separator that allows the evacuation of gases toward the means for drawing them in or evacuating them or the evacuation of the possible surplus of resin that flows under the action of pressure, . . . are then deposited.

Finally, the compacting membrane 60 and the bladder(s) 64 are installed. The connections between the compacting membrane and the bladder(s) and between said membrane and the mold should be perfectly airtight. A stage of putting the inside of the device under vacuum makes it possible to verify this sealing.

Next, the entire device is placed in an autoclave that is closed again.

Finally, exposure to pressure and temperature is carried out according to precise cycles.

After polymerization, the part is removed from the mold.

In the case of a Z-shaped part, as illustrated in FIG. 8, a homogeneous matrix is obtained without vacuum, unlike the one shown in FIG. 4.

Thus, the device of the invention makes it possible to reduce the risk of defects and to guarantee the required mechanical characteristics.

The invention claimed is:

1. A device for manufacturing a composite material part that comprises a resin matrix that is reinforced by fibers and has a Z-shaped section with a recessed zone with walls and an opening to outside the recessed zone, said device comprising:

a mold whose shapes are adapted to those of the part;

a compacting membrane adapted to cover at least part of said mold and to cover the opening of the recessed zone;

sealing means at a periphery of the part between said mold and said compacting membrane; and at least one inflatable tubular bladder with closed ends between the part and the compacting membrane in the recessed zone between the walls of the recessed zone, said at least one inflatable tubular bladder comprising at least one orifice between the closed ends that communicates with a corresponding orifice in said compacting membrane to link an inside volume of said inflatable tubular bladder with an outside of the device, said at least one inflatable tubular bladder being adapted to occupy a first state before polymerization in which said at least one inflatable tubular bladder occupies a low volume so as to allow insertion into the opening of the recessed zone, and a second state during polymerization in which said at least one inflatable tubular bladder occupies a larger volume so as to exert pressure on the walls of the recessed zone, wherein said compacting membrane exerts pressure against said at least one inflatable tubular bladder during polymerization to press said at least one inflatable tubular bladder against the walls of the recessed zone that are in contact with said at least one inflatable tubular bladder.

2. The device according to claim 1, further comprising a further sealing means at said corresponding orifice of said compacting membrane.

3. A device for manufacturing a composite material part that comprises a resin matrix reinforced by fibers and a C-shaped zone with walls and an opening that opens to outside the C-shaped zone, said device comprising:

a mold with a recess with interior sides and a passage to outside the recess, the recess being adapted to form the C-shaped zone of the part;

a compacting membrane adapted to cover at least part of said mold and to cover the passage of the recess and the opening of the C-shaped zone when the part is inside the recess, the compacting membrane comprising a first orifice to outside the device;

sealing means at a periphery of the C-shaped zone of the part between said mold and said compacting membrane; and an inflatable tubular bladder that, when the C-shaped zone of the part is in the recess, is between the C-shaped zone of the part and the compacting membrane, wherein said inflatable tubular bladder comprises a second orifice that communicates with the first orifice to link an inside volume of said inflatable tubular bladder with outside of the device, and wherein said inflatable tubular bladder is adapted to occupy a first state in which said inflatable tubular bladder occupies a low volume so as to allow insertion into the opening of the C-shaped zone of the part, and a second state in which said inflatable tubular bladder occupies a larger volume so as to urge the walls of the C-shaped zone of the part against the corresponding interior sides of the recess of the mold.

* * * * *